United States Patent [19]

Strong et al.

[11] Patent Number: 5,505,997
[45] Date of Patent: Apr. 9, 1996

[54] METHOD AND APPARATUS FOR APPLYING COATINGS OF MOLTEN MOISTURE CURABLE ORGANOSILOXANE COMPOSITIONS

[75] Inventors: Michael R. Strong; Bernard VanWert; Martin E. Cifuentes, all of Midland, Mich.

[73] Assignee: Dow Corning Corporation, Midland, Mich.

[21] Appl. No.: 235,739

[22] Filed: Apr. 29, 1994

[51] Int. Cl.[6] .................................. B05D 3/04; B05D 3/12
[52] U.S. Cl. .......................... 427/348; 427/378; 427/387; 427/422; 239/135; 239/290
[58] Field of Search ............................. 427/348, 377, 427/378, 387, 422, 420; 239/132, 135, 290, 296, 298

[56] References Cited

U.S. PATENT DOCUMENTS

| | | | |
|---|---|---|---|
| 4,106,697 | 8/1978 | Sickles et al. | 239/15 |
| 4,132,357 | 1/1979 | Blackinton | 239/11 |
| 4,642,158 | 2/1987 | Steinel et al. | 156/497 |
| 4,778,642 | 10/1988 | Lee et al. | 264/510 |
| 4,865,920 | 9/1989 | Sweet | 428/447 |
| 4,911,956 | 3/1990 | Gabryszewski et al. | 427/424 |
| 4,957,783 | 9/1990 | Gabryszewski | 427/424 |
| 4,988,779 | 1/1991 | Medford et al. | 525/478 |
| 4,991,772 | 2/1991 | Costa et al. | 239/1 |
| 4,995,333 | 2/1991 | Keller et al. | 118/300 |
| 5,034,061 | 7/1991 | Maguire et al. | 106/287.14 |
| 5,270,425 | 12/1993 | VanWert et al. | 528/15 |
| 5,302,671 | 4/1994 | Cifuentes et al. | 525/477 |
| 5,352,491 | 10/1994 | Cifuentes et al. | 427/387 |

FOREIGN PATENT DOCUMENTS

| | | |
|---|---|---|
| 0363799 | 10/1989 | European Pat. Off. . |
| 628617 | 12/1994 | European Pat. Off. . |
| 2137638 | 10/1984 | United Kingdom . |

*Primary Examiner*—Shrive Beck
*Assistant Examiner*—Erma Cameron
*Attorney, Agent, or Firm*—Robert Spector

[57] ABSTRACT

A stream of a molten moisture curable organosiloxane composition is entrained in a current of a heated gas containing a concentration of water vapor below the saturation level of the gas at 25° C. The gas current directs the organosiloxane composition toward the surface to be coated and provides an environment adjacent to the surface of the coated substrate that causes at least the surface layer of the composition to cure at a rate that is substantially constant and independent of the temperature and humidity in the macroscopic environment of the substrate.

6 Claims, 1 Drawing Sheet

METHOD AND APPARATUS FOR APPLYING COATINGS OF MOLTEN MOISTURE CURABLE ORGANOSILOXANE COMPOSITIONS

BACKGROUND OF THE INVENTION

1. Field of the Invention

This invention relates to the application and curing of organosiloxane coating compositions. More particularly, this invention relates to a method and an apparatus for applying coatings of molten, moisture curable organosiloxane compositions that cure in a controlled and reproducible manner.

2. Background Information

It is known to liquify adhesives and coating composition that are solids under ambient conditions by heating the materials above their melting point and applying the resultant liquid to a substrate by spraying, dipping or other conventional coating methods. The molten materials are often referred to in the prior art as "hot melt" compositions.

The use of a heated air stream generated by a blower to both melt an adhesive and heat the surfaces to be bonded is described in U.S. Pat. No. 4,642,158, which issued on Feb. 10, 1987.

The addition of materials containing adsorbed or chemically combined water to moisture curable hot melt adhesives or sealants containing isocyanate groups is described in British patent no. 2,137,638.

The use of gas currents to control the contour and/or direction of a stream of molten coating material as it travels from its source to the substrate is known. For example, European Patent Application No. 363,799 teaches using compressed air at ambient temperature to form an atomized spray of a hot melt adhesive that is guided toward the substrate by air jets directed obliquely downward on to the atomized mixture.

A method for preparing non-curable organosiloxane hot melt pressure sensitive adhesives is described in U.S. Pat. No. 4,865,920, which issued to Randall Sweet.

Moisture curable hot-melt organosiloxane compositions are described in commonly owned copending applications filed in the United States Patent and Trademark Office. It has heretofore not been feasible to apply these compositions as uniform coatings that cure in a reproducible manner irrespective of the temperature and humidity in the area of the coated substrate. One objective of the present invention is to provide such a method.

SUMMARY OF THE INVENTION

In accordance with the present method a stream of a molten moisture curable organosiloxane composition is entrained in a current of a heated gas that directs the organosiloxane composition toward the surface to be coated. The gas stream contains sufficient vaporized water to create an environment on the substrate wherein the temperature and humidity are relatively constant, thereby causing at least the surface of the deposited composition to cure at an accelerated rate that is substantially constant and independent of the temperature and humidity in the macroscopic environment of the substrate.

DETAILED DESCRIPTION OF THE INVENTION

Figure 1:
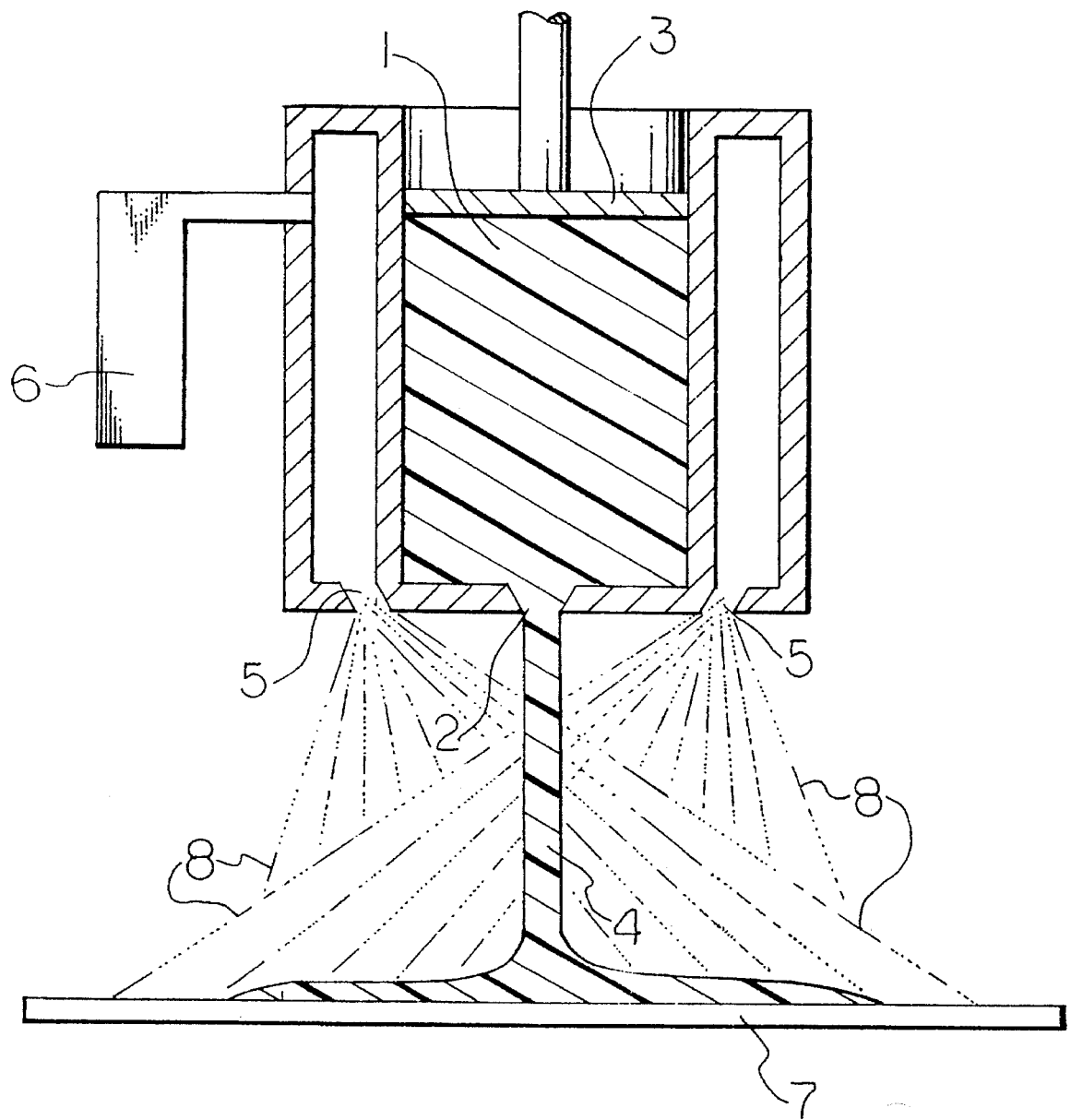
FIG. 1 is a diagrammatic view of an apparatus suitable for use in accordance with the present method.

One embodiment of this invention provides a method for coating a substrate with a molten moisture curable organosiloxane composition exhibiting a flow temperature of at least 30 degrees C., said method comprising the steps of 1) maintaining a supply of said composition in a reservoir at a temperature above the flow temperature of said composition, wherein said reservoir communicates with at least one nozzle;

2) extruding said composition through said nozzle, thereby producing a stream of said composition directed toward said substrate;

3) supplying a current of gas directed against said stream to control the direction and configuration of said stream, wherein the temperature of said gas current is above 25° C., the relative humidity within said gas current is from 5 to 95 percent, measured at 25° C., and said gas current creates an environment in the area between said nozzle and said substrate wherein at least the surface layer of said composition cures at a reproducible rate irrespective of the indigenous temperature and humidity in the area adjacent to said environment.

In accordance with the present method the temperature and humidity in the environment created by the gas current are controlled to remain substantially constant. Depending upon the particular composition, the temperature of the gas current is from 30° to about 150° C. and the relative humidity of the gas current, measured at a temperature of 25° C., is from 5 to 95 percent, preferably from 40 to 95 percent.

The novel feature of the present method resides in using the same current of a heated moisture-containing gas to (1) control the direction and configuration of a stream of molten curable material, (2) maintain the temperature of the composition at a level that allows the composition to form a coherent coating on the substrate and (3) create an environment in the area of the substrate being coated such that at least the surface layer of the coating cures at a reproducible rate that is substantially independent of the indigenous temperature and humidity in the area adjacent to this environment. This area is referred to in this specification as the macroscopic environment of the substrate.

It is well known that the cure rate of the surface layer of moisture curable organosiloxane compositions, also referred to as "skin-over time", is dependent on the temperature and moisture content of the environment in which curing is occurring, and can vary from several minutes to several hours. This variability is particularly undesirable when the coating operation is part of a multi-step process, the next step of which requires that the surface of the coating be solid or at least non-transferable.

A diagrammatic view of an apparatus for implementing the present method is illustrated in FIG. 1. A supply of a moisture curable organosiloxane composition that is non-flowable at 25° C. is maintained in a heated reservoir (1) and is extruded through a nozzle (2) by means of a pressure plate (3) or other means for maintaining the contents of the reservoir under sufficient pressure to force it through the nozzle. The composition is maintained in a flowable state by heating means (not shown). The pressure plate is activated by suitable means to exert the pressure required to extrude the molten composition through the nozzle as a stream (4) which is shown as continuous, but can be in the form of droplets, depending upon the viscosity and surface tension of the molten curable organosiloxane composition and the velocity of the gas current described in the following paragraphs.

At least one jet (5) is located adjacent to the nozzle. A moisture-containing pressurized gas at a temperature above 25° C. is supplied to the gas jets from a suitable source (6). A number of individual gas jets can be spaced around the nozzle (2), or the jet can take the form of an annular orifice surrounding the nozzle.

To prevent water condensation on the substrate the moisture content of the gas stream is such that at a temperature of 25° C. the relative humidity within the gas stream does not exceed 95 percent. The relationship between moisture content, temperature and relative humidity for gases is sufficiently well understood that a detailed description in the present specification would be superfluous.

The heated, moisture-containing gas stream(s) issuing from the gas jet(s) forms a current that guides the curable composition toward the surface of the substrate (7) in addition to increasing the moisture content of the composition. By suitable adjustment of jet orientation and gas flow rate, the gas current creates an environment (8) in the area between the gas jet(s) and the substrate wherein at least initial curing of the curable composition occurs under relatively constant conditions of temperature and humidity. As a result, the time required to cure, i.e. crosslink, at least the surface layer of the curable composition to the extent that the compositions are solid and no longer "tacky" does not vary by more than about ±20 percent from the average value, irrespective of the temperature and relative humidity in the area outside the environment defined by the gas current. Typical average surface cure times, also referred to as "skin-over times" are from 3 to 20 minutes.

The term "relatively constant conditions" implies that the temperature and humidity within the environment created by the gas stream and the amount of moisture absorbed by the curable composition as it passes through this environment typically do not vary by more than about 10 percent from the target values. The area adjacent to this environment is referred to in this specification as the "macroscopic environment" of the substrate and the temperature and humidity in the macroscopic environment are referred to as "indigenous conditions".

Some compositions that can be applied and cured in accordance with the present method may remain "tacky" for days or months when cured, depending upon the types and amounts of ingredients in the curable composition, particularly the relative concentrations and molecular weights of ingredients A and B.

The Curable Composition

Moisture curable organosiloxane compositions suitable for use in accordance with the present method have a softening temperature of at least about 30° C. and comprise a liquid polyorganosiloxane, referred to hereinafter as ingredient A, containing at least two silicon-bonded hydrolyzable groups at each terminal position of the molecule and an organosiloxane copolymer comprising $R^1_3SiO_{1/2}$ (M) and $SiO_{4/2}$ (Q) units wherein $R^1$ represents a monovalent unsubstituted or substituted hydrocarbon radical. Any substituents present on $R^1$ do not react with any of the ingredients of the present compositions. The organosiloxane copolymer will be referred to hereinafter as ingredient B.

Ingredient A is a liquid at 25° C. Ingredient B is a solid at 25° C. and has a softening temperature of between about 30° and about 150° C.

In the presence of moisture the hydrolyzable groups on at least the polyorganosiloxane (ingredient A) of the present compositions react to gradually convert the compositions to substantially tack-free resin-reinforced elastomeric materials that will no longer flow at the temperature used to apply the coating. During at least the initial stages of this conversion the flow transition temperature of the composition does not appreciably increase, and the composition can be reflowed by heating to temperatures of from 60° to 200° C.

During conversion of the present compositions from materials that flow at elevated temperatures to non-flowable resin reinforced elastomers by reaction of the hydrolyzable groups, the flow transition temperature of the composition increases by at least 10° C., preferably by at least 50° C., relative to the initial composition. In most instances the final composition may soften but will not flow at temperatures up to 200° C.

The flow characteristics of the present curable compositions change when heated above their flow transition temperature to the extent that they can readily be applied in accordance with the present method. The dynamic viscosity of the present compositions decreases to not more than about 10 Pa.s at a temperature not exceeding 200° C.

Preferred compositions become non-transferable within ten minutes after cooling to ambient temperature on the surface of the substrate. As used in this specification, the term "non-transferable" that characterizes preferred coating compositions implies that when an object at ambient temperature contacts the surface of a coating that has cooled to the temperature of the substrate, no material is transferred from the coating to the object.

The flow transition temperature and other rheological properties of a composition of this invention can be varied by selection of a particular MQ resin (ingredient B), and polyorganosiloxane (ingredient A), and by varying the relative concentrations of these two ingredients.

It should be understood that inclusion of two or more different resins and polymers will affect not only the flow characteristics of the blend but also the properties of the product obtained following reaction of the hydrolyzable groups present on at least the polymer ingredients to form a crosslinked resin reinforced elastomer.

The relative concentrations of resin and polymer required to achieve the optimum combination of properties that characterizes the present compositions is dependent at least in part on the molecular weights of these ingredients.

A convenient way of expressing the range of relative concentration ranges for MQ resin and liquid polyorganosiloxane is in terms of the melt viscosity of the mixture prior to reaction of the hydrolyzable groups, which is typically less than about 10 Pa.s at the temperature used to apply coatings in accordance with the present method. This is in addition to the aforementioned requirements that a 0.003 inch-thick layer of the composition is non-flowable on a vertical surface under ambient conditions once the composition has cooled to the temperature of the substrate, and that the composition remains reflowable with heating during at least the early stages of the conversion to a resin-reinforced elastomer.

For preferred combinations of MQ resins and liquid polyorganosiloxanes encompassed by the present invention the resin constitutes from 40 to 80 percent of the combined weight of the resin and the liquid polyorganosiloxane. Compositions containing less than about 40 weight percent of even the highest molecular weight resins are flowable at 25° C., even when the resin is the highest molecular weight that will form a flowable composition in accordance with the present method. Compositions containing more than about 80 weight percent of even the lowest molecular weight resins are difficult to process using conventional melt coating techniques at temperatures up to 200° C. or form coatings that are often brittle, even with the lowest molecular weight resins suitable for use in accordance with the present method.

The Moisture Curable Polyorganosiloxane (Ingredient A)

At least 50 percent of the repeating units of ingredient A are difunctional (D) units of the formula $R^2R^3SiO$. This ingredient can optionally contain up to about 20 percent, based on total repeating units, of trifunctional (T) units of the formula $R^4SiO_{3/2}$. In these formulae $R^2$ represents a hydrocarbyl radical selected from the same group as $R^1$ or an alkoxy group, and $R^3$ and $R^4$ are individually selected from the same group as $R^1$.

At least 50 percent, preferably at least 80 percent, of the radicals represented by $R^2$, $R^3$ and $R^4$ are lower alkyl, most preferably methyl.

The total number of repeating units per molecule of ingredient A is sufficient to impart a viscosity of from 20 to 100,000 centipoise (0.02 to 100 Pa.s) at 25° C. to this ingredient. A viscosity of from 0.05 to 25 Pa.s is preferred, which can be achieved using a single polyorganosiloxane or a mixture containing two or more polyorganosiloxanes.

The terminal units present on ingredient A contain at least two hydrolyzable groups and can be represented by the formula $R^5_aY_{3-a}SiG$—, where Y is a hydrolyzable group, $R^5$ is selected from aminoalkyl in addition to the same group of substituted and unsubstituted hydrocarbon radicals as $R^1$, G represents a divalent group linking the silicon atom of the terminal unit with another silicon atom and a is 0 or 1.

Typical hydrolyzable groups include but are not limited to alkoxy such as methoxy, alkenyloxy such as isopropenyloxy, ketoximo such as methylethylketoximo, carboxy such as acetoxy, amidoxy such as acetamidoxy and aminoxy such as N,N-dimethylaminoxy.

The groups represented by Y are preferably alkoxy or methylethylketoximo and $R^5$ is alkyl, such as methyl or ethyl, or aminoalkyl such as 3-aminopropyl or 3-[N-(2-aminoethylamino)]propyl. If an amino group is present on a hydrolyzable group, the amino group can be primary, secondary or tertiary.

In the formula for the terminal unit, G represents any divalent group or atom which is not hydrolyzable and links the silicon atom(s) of the terminal unit to another silicon atom of ingredient A such that the terminal unit is not removed during curing of the composition and the curing reaction is not adversely affected. Hydrolytically stable linkages represented by G include but are not limited to oxygen, siloxy, hydrocarbylene such as alkylene and phenylene, hydrocarbylene containing one or more hetero atoms selected from oxygen, nitrogen and sulfur, and combinations of these linking groups, such as siloxyalkylene.

G is preferably —$(OSiMe_2)CH_2CH_2$—, —$(CH_2CH_2SiMe_2)(OSiMe_2)CH_2CH_2$—, —$(CH_2CH_2SiMe_2)O$—, $(CH_2CH_2SiMe_2)OSiMe_2)O$—, —$(CH_2CH_2SiMe_2)CH_2CH_2$— and —$CH_2CH_2$—, a siloxane linkage such as —$(OSiMe_2)O$— or an oxygen atom.

Preferred terminal groups include but are not limited to —$(MeO)_3SiCH_2CH_2$—, $(MeO)_3SiO$—, $Me(MeO)_2SiO$—, $H_2NCH_2CH_2N(H)(CH_2)_3(EtO)_2SiO$—, $(EtO)_3SiO$—, $(MeO)_3SiCH_2CH_2Si$— $MeCH_2CH_2Si(Me_2)O$—, $Me_2NOSiO$—, $MeC(O)N(H)SiO$— and $CH_2=C(CH_3)OSiO$—. Me in these formulae represents methyl and Et represents ethyl.

In addition to the —$CH_2CH_2$— shown in some of the preceding terminal groups the isomeric —$CH(CH_3)$— radicals can also be present as a result of the hydrosilation reaction between a silicon bonded vinyl radical and a silicon-bonded hydrogen atom. This reaction is used to form some of the present terminal units.

A portion of the terminal units represented by $R^5_aY_{3-a}SiG$ can be present on ingredient B, depending upon whether the reactant used to form the terminal units is reacted with the MQ resin, the liquid polyorganosiloxane or a mixture of these ingredients.

The terminal units of ingredients A and B can be present on these initial reactants or the terminal units can be formed in situ by reaction of the corresponding silanol, alkenyl or SiH-groups present on the precursors of ingredient A and/or B with an organosilicon compound containing the desired terminal group in addition to a group that will react with the group present on the precursor.

Organosilicon compounds that can be reacted with the silanol groups to form the reactive terminal groups present in the final curable composition include silanes, disiloxanes, disilazanes and functionally substituted polydiorganosiloxanes.

The silanes used to form hydrolyzable groups on ingredients A and B can be represented by the general formula $Y_3SiG'$, where G' represents a group that will react with a silanol group, SiH, or $SiCH=CH_2$ to form the desired linking group G. It will be understood that G' can be selected from the same group as Y.

Disiloxanes can be represented by the formula $(Y_3Si)_2O$ and disilazanes by the formula $(Y_3Si)_2NH$.

In the following preparative methods Me represents the methyl radical for purposes of simplifying the formulae. It will be understood that other hydrocarbon radicals can be substituted for methyl.

$(MeO)_3SiCH_2CH_2$— radicals and $(MeO)_3SiCH_2CH_2SiMe_2OSiMe_2CH_2CH_2$— radicals can be introduced into a vinyl-terminated polyorganosiloxane using organosilicon compounds having the formula $(MeO)_3SiH$ and $(MeO)_3SiCH_2CH_2SiMe_2OSiMe_2H$, respectively.

Moisture reactive groups having the formulae $(MeO)_3SiO$— and $Me(MeO)_2SiO$— can be introduced into a silanol-terminated polyorganosiloxane by compounds having the formulae $(MeO)_4Si$ and $Me(MeO)_3Si$, respectively. Alternatively, compounds having the formulae $(MeO)_3SiH$ and $Me(MeO)_2SiH$, respectively, can be used when the polyorganosiloxane contains silanol groups or alkenyl radicals such as vinyl and a platinum group metal or a compound thereof as a hydrosilation reaction catalyst. It will be understood that other hydrolyzable groups such as alkenyloxy and carboxy can replace the alkoxy group.

Ingredient A is preferably a polydimethylsiloxanes containing three alkoxy or ketoximo groups, or two alkoxy groups together with either an alkyl or aminoalkyl radical.

The Resinous Organosiloxane Copolymer (MQ Resin, ingredient B)

The resinous copolymer constitutes the second of the two types of organosiloxane materials present in compositions used in the present method. The resins contain monofunctional (M) units represented by the formula $R^1_3SiO_{1/2}$ and tetrafunctional (Q) units represented by the formula $SiO_{4/2}$. $R^1$ represents a substituted or unsubstituted monovalent hydrocarbon radical Resins of this type are well known in the art as one of the ingredients present in organosiloxane compositions used as pressure sensitive adhesives.

Ingredient B is soluble in liquid hydrocarbons such as benzene, toluene, xylene, heptane and the like or in liquid organosilicon compounds such as a low viscosity cyclic and linear polydiorganosiloxanes.

In the $R^1_3SiO_{1/2}$ or M units $R^1$ represents a monovalent hydrocarbon radical containing preferably up to 20 carbon atoms, and most preferably from 1 to 10 carbon atoms.

Examples of suitable hydrocarbon radicals for $R^1$ include alkyl radicals, such as methyl, ethyl, propyl, pentyl, octyl, undecyl and octadecyl; alkenyl radicals, such as vinyl, allyl and 5-hexenyl; cycloaliphatic radicals, such as cyclohexyl and cyclohexenylethyl; and aryl radicals such as phenyl, tolyl, xylyl, benzyl and 2-phenylethyl. Typical substituted hydrocarbon radicals that can be represented by $R^1$ include chloromethyl and 3,3,3-trifluoropropyl. The hydrocarbon radicals represented by $R^1$ are preferably selected from the group consisting of methyl, phenyl and 3,3,3-trifluoropropyl.

At least one-third, preferably at least two-thirds of the $R^1$ radicals in the formula for the M unit of the MQ resin are methyl radicals. Examples of preferred M units include but are not limited to $HMe_2SiO_{1/2}$, $Me_3SiO_{1/2}$, $PhMe_2SiO_{1/2}$ and $Me_2ViSiO_{1/2}$ where Me, Ph and Vi denote methyl, phenyl and vinyl, respectively. The resin may contain two or more of these units.

The molar ratio of the M to Q units in ingredient B is typically from 0.5/1 to 1.5/1, preferably from 0.6/1 to 1.0/1. These mol ratios are conveniently measured by $Si^{29}$ nuclear magnetic resonance (n.m.r.) spectroscopy. This technique can be used to quantitatively determine the molar concentrations of: M (resin), M(neopentamer), Q (resin), Q(neopentamer) and hydroxyl groups. For the purposes of the present invention the M/Q ratio {M(resin)+M(neopentamer)}/{Q(resin)+Q(neopentamer)} represents the ratio of the total number of triorganosiloxy groups in the resinous and neopentamer portions of the copolymer to the total number of silicate groups of the resinous and neopentamer portions of ingredient B. It will be understood that the neopentamer portion includes only that amount inherently present in the copolymer as it is prepared.

The concentration of silanol groups present in ingredient B can be determined using Fourier Transform Infrared Spectrophotometry (FTIR)

Silicon-bonded terminal groups that can be present in ingredient B include but are not limited to reactive groups such as silanol, silicon-bonded hydrogen, alkenyl radicals and hydrolyzable groups that include but are not limited to alkoxy such as methoxy, alkenyloxy such as isopropenyloxy, ketoximo such as methylethylketoximo, carboxy such as acetoxy, amidoxy such as acetamidoxy and aminoxy such as N,N-dimethylaminoxy. Alternatively the terminal groups present on the resin can be unreactive groups such as trihydrocarbylsiloxy.

When reactive groups are present they typically constitute up to about 6 weight percent of the MQ resin. It will be understood that silanol groups can be present only in the absence of a suitable catalyst for the reaction of these silanol groups with the alkoxy or other hydrolyzable groups present on the polyorganosiloxane ingredient of the present compositions.

To maximize the storage stability of the present compositions under ambient conditions the silanol groups formed during preparation of ingredient B are converted to trihydrocarbylsiloxy groups or a hydrolyzable group such as those described in the preceding section of this specification. The conversion is conveniently achieved by reacting the resin with a silane, disiloxane or disilazane containing the appropriate terminal group. Silanes containing hydrolyzable groups are typically added in excess of the quantity required to react with the silanol groups of the resin. These groups are responsible for conversion of the present compositions from materials that are flowable with heating to resin reinforced elastomers that may soften but do not flow at temperatures from 60° to 200° C.

It will be understood that if all the initial silanol groups of ingredient B are converted to triorganosiloxy groups by reaction with a monofunctional reactant such as a silane, disiloxane or disilazane, this ingredient does not participate in the reaction(s) used to cure the composition.

The molecular weight required to achieve the desired flow characteristics of ingredient B will depend at least in part on the molecular weight of this resin and the type(s) of hydrocarbon radicals represented by $R^1$. For the preferred resins where $R^1$ is alkyl containing from 1 to 3 carbon atoms the number average molecular weight of the resin is preferably from 1500 to about 15,000, preferably from 2700 to 6500. The molecular weight ingredient B is conveniently determined using gel permeation chromatography with MQ resin standards rather than the conventional polystyrene standards.

Ingredient B can be prepared by any suitable method. Resins of this type have reportedly been prepared by cohydrolysis of the corresponding silanes or by silica hydrosol capping methods known in the art. This ingredient is preferably prepared by the silica hydrosol capping processes of Daudt, et al., U.S. Pat. No. 2,676,182; of Rivers-Farrell et al., U.S. Pat. No. 4,611,042; and of Butler, U.S. Pat. No. 4,774,310; each of these patents being incorporated herein by reference as a teaching of preparing MQ resins which can be reacted to contain terminal groups that participate in curing of the present compositions.

The intermediates used to prepare ingredient B are typically triorganosilanes of the formula $R^1_3SiX$, where X represents a hydrolyzable group, and either a silane with four hydrolyzable groups such as halogen, alkoxy or hydroxyl, or an alkali metal silicate such as sodium silicate. Non-reactive substituents that can be present on $R^1$ include but are not limited to halogen and cyano.

To form useful coatings in accordance with the present method ingredient B should be a tack-free solid at 25° C. and soften sufficiently at a temperature from 40° to 200° C. to flow in the presence of the other ingredients of the coating composition under the conditions used to apply the compositions in accordance with the present method.

The Optional Curing Agent

Depending upon the reaction used to cure the present compositions and the reactive terminal units present on the MQ resin and the liquid polyorganosiloxane, storage stability and/or curing of the composition may be improved by the presence of a curing agent that is typically a silane of the formula $R^6_nSiZ_{(4-n)}$, where $R^6$ represents an alkyl or a phenyl radical and Z is a hydrolyzable group that reacts with the terminal groups of at least the liquid polyorganosiloxane under ambient conditions to form a cured material and 5 is preferably 0 or 1. Suitable hydrolyzable groups represented by Z include but are not limited to alkoxy containing from 1 to 4 carbon atoms, carboxy such as acetoxy, ketoximo such as methylethylketoximo and aminoxy ($NH_2O—$).

Suitable curing agents include but are not limited to methyltrimethoxysilane, methyltris(methylethylketoximo)silane, methyltriethoxysilane, methyltriacetoxysilane, 3[N-(2-aminoethyl)amino]propyltrimethoxysilane and alkyl orthosilicates such as ethyl orthosilicate.

When the hydrolyzable group present on the polyorganosiloxane ingredient is alkoxy the present inventors discovered that the ability of the cured compositions to retain adhesion at elevated temperatures is improved when a phenyltrialkoxysilane such as phenyltrimethoxysilane is used as the silane.

The presence of sufficient silane to react with at least a portion of the silanol groups on the MQ resin has been found particularly desirable using resins with molecular weights greater than about 3000 to avoid gelling during preparation of the curable composition. When the silane is used for this purpose the hydrolyzable groups present on the silane are preferably ketoximo or carboxy such as acetoxy, this preference being based on the higher reactivity of these hydrolyzable groups, relative to alkoxy, with the silanol groups present on the MQ resin.

The Optional Curing Catalyst

Some of the reactions used to cure the present compositions either require a catalyst or proceed at a considerably more rapid rate in the presence of a catalyst. Suitable curing catalyst will depend upon the curing reaction, and include but are not limited to tin salts of carboxylic acids, such as stannous octoate and dibutyltin dilaurate, and organotitanium compounds such as tetrabutyl titanate and partially chelated derivatives of these salts with chelating agents such as acetoacetic acid esters and beta-diketones.

The hydrolyzable groups can either all be present on the liquid polyorganosiloxane or a portion can be present on one or more silanes or other organosilicon compounds that react during curing of the composition.

To prevent premature curing of the composition it should be stored in the absence of moisture prior to being heated and applied as described in the following section of this specification.

Preparation of Curable Compositions

Curable compositions suitable for use in accordance with the present method are prepared by blending the ingredients of the compositions to homogeneity. Depending upon the molecular weights of ingredients A and B, the relative concentrations of these ingredients and the silanol content of the resin, it may be desirable to pre-react the silanol groups of a precursor of ingredient A prior to adding ingredient B. It has been found that compositions containing MQ resins (ingredient B) with an average of more that about three silanol groups per molecule have a tendency to form gels in the presence of silanol-functional polymers, alkoxy functional silanes and catalysts such as organotitanium compounds.

The ingredients of the curable compositions are preferably combined above the melting temperature of ingredient B and in the absence of atmospheric moisture to prevent premature curing of the composition.

Application of Coatings

Referring to the accompanying drawing identified as FIG. 1, in accordance with the present method the curable organosiloxane composition is stored as a molten material in a heated reservoir (1). When it is desired to apply coatings the composition is extruded through a suitable nozzle (2) that can be part of the reservoir, as shown in the accompanying drawing or is connected to the reservoir by means of a suitable conduit.

Depending upon the viscosity of the molten curable composition the pressure required to extrude the composition can be gravity and the weight of the composition. Preferably pressure is applied to the material in the reservoir using a pressure plate (3) or a ram that is operated either mechanically or by a suitable pressure source such as a pump or compressor (not shown). Alternatively, the reservoir is only partially filled with the curable composition and a gas is introduced into the empty space above the composition to pressurize the reservoir chamber sufficiently to extrude the composition through the nozzle.

As a stream of molten curable composition (4) emerges from the nozzle it is contacted by a current of moisture containing gas that has been heated to a temperature above 25° C. The temperature of the gas stream is preferably higher than ambient by at least 25 percent of the difference between ambient and the flow temperature of the curable composition. This lower temperature limit can be expressed mathematically as $T_A+0.25(T_F-T_A)$, where $T_A$ is the ambient temperature in the macroscopic environment of the substrate and $T_F$ is the flow temperature of the curable composition.

The moisture content of the gas current used to guide the curable composition to the substrate is such that the relative humidity within the environment created by the current is at least about 40% and does not exceed 95% when measured at a temperature of 25° C. The upper limit of 95% is intended to avoid condensation of liquid water onto the surface of the coated substrate during curing.

Methods and apparatus for increasing the moisture content of a heated gas stream at flow rates suitable for the present method are sufficiently well known that a detailed description is not required as part of this specification.

The individual gas streams that form the gas current emerge from jets (5) that are preferably located around the perimeter of the nozzle through which the stream of molten curable material is being extruded. The gas jets are typically from 0.1 to 1.6 mm. in diameter and the pressure of the gas current is typically from 10 to 90 pounds per square inch (7–63 Kpa). These conditions will produce a flow rate of from 0.5 to 10 cc/minute.

The gas jets are supplied from a suitable source (6) that includes means to introduce the desired quantity of water vapor into the gas stream. A curing catalyst for the moisture curable composition, such as an organotitanium compound or a tin compound can be dissolved or dispersed in the water supply if the partial vapor pressure of the catalyst is sufficient for the catalyst to be transported together with the water and blended into the gas stream.

Suitable gases include but are not limited to air, nitrogen, and mixtures containing two or more of these gases with steam.

The gas current interacts with the stream of molten curable composition emerging from the nozzle and directs the composition toward the substrate to be coated (7). Depending upon the velocity of the gas current and the viscosity and surface tension of the molten curable composition, the liquid stream can be atomized to form droplets that are entrained in the gas current. Droplets are a preferred form because they blend more readily with the moisture and any other ingredients such as curing catalyst present in the gas stream used to transport the curable material.

In addition to directing the curable composition toward the substrate, the gas current forms an environment (8) in the area between the gas jets and the surface of the substrate being coated. Within this environment the temperature and humidity are maintained at relatively constant levels irrespective of changes in the indigenous conditions in the area adjacent to this environment.

Under preferred operating conditions for the present method the temperature and moisture content of the gas current are adjusted to maintain the temperature in the environment created by the gas current relatively constant at a value between 30° and 90° C. and the relative humidity, measured at 25° C., at a relatively constant value of between 40 and 95% . The present inventors discovered that this range of conditions will allow at least the surface layer of the composition to cure at a relatively constant and reproducible rate, irrespective of conditions in the macroscopic environment of the substrate.

For preferred compositions the time required to achieve a tack-free surface when the temperature and moisture content of the gas current are maintained within the present limits is typically from 1 to 30 minutes, with complete curing occurring in from 8 to 72 hours. It will be understood that the types and concentrations of moisture-reactive groups in the curable composition will determine the cure time of the composition under given conditions of temperature and humidity.

EXAMPLE

In a typical example of a coating process within the scope of the present invention, a curable composition was prepared by blending the ingredients of the composition to homogeneity in the absence of moisture. Unless otherwise indicated all parts and percentages, are by weight and viscosities are the values measured at 25° C.

General Procedure For Preparing Curable Compositions

The amounts of polydiorganosiloxane and solubilized resin required for a particular composition together with the silane and curing catalyst, were combined under ambient conditions in a glass reactor and heated at a temperature of from 50° to 60° C. for 30 minutes, at which time the temperature applied to the reactants was increased and the contents of the flask were placed under reduced pressure until the temperature of the material in the reactor reached 90° C. or 130° C. under a pressure of no more than 10 mm. Hg. In some instances the maximum temperature was maintained for from 10 to 15 minutes to obtain a homogeneous molten material.

The polyorganosiloxanes and MQ resins used to prepare the curable compositions are listed in Table 1. In this table the MQ resins are represented by numbers and the liquid polyorganosiloxanes (polymers) by letters, in accordance with the following definitions.

Resin 1 A 72 weight percent solution in xylene of an organosiloxane copolymer exhibiting a molecular weight of about 5000, measured using gel permeation chromatography with a resin standard, and consisting essentially of trimethylsiloxy and $SiO_2$ unit in a molar ratio of about 0.8/1 and containing about 2.6 weight percent of silicon-bonded hydroxyl groups, based on the weight of the solution;

Resin 2 A 62 weight percent solution in xylene of resin 2 wherein all but 0.3 percent of the silicon-bonded hydroxyl groups are replaced by trimethylsiloxy groups.

Polyorganosiloxane A- A triethoxy-terminated polydimethylsiloxane exhibiting a degree of polymerization of 300.

Polyorganosiloxane B- A methyldimethoxy-terminated polydimethylsiloxane exhibiting a degree of polymerization of 40.

Polyorganosiloxane C- A hydroxyl-terminated polydimethylsiloxane exhibiting a viscosity of 4.0 Pa.s Polyorganosiloxane D- a methoxy-terminated dimethylsiloxane/phenylmethoxysiloxane/phenylsilsesquioxane copolymer containing 67 mole percent of dimethylsiloxane units, 33 mole percent of phenyl containing siloxane units and a viscosity of 0.013 Pa.s; the polymer was prepared by reacting 41 parts of phenyltrimethoxysilane for each 56 parts of cyclic dimethylsiloxanes in the presence of a Lewis Acid catalyst.

Polyorganosiloxane E- a dimethylvinylsiloxy-terminated polydimethylsiloxane having a viscosity of about 0.4 Pa.s at 25° C.

Curable composition 1 was prepared by blending the 60 parts by-weight of resin 1 with 40 parts by weight of polyorganosiloxane A and 0.5 parts by weight of tetrabutyl titanate.

Curable composition 2 was prepared in the same manner as composition 1 using 40 parts of polyorganosiloxane B in place of polyorganosiloxane A.

Curable composition 3 was prepared in the same manner as composition 1 using 40 parts of polyorganosiloxane C in place of polyorganosiloxane A.

Curable composition 4 was prepared by blending 85.4 parts by weight of polyorganosiloxane E with a reaction product of hexachloroplatinic acid and sym-tetramethyldivinyldisiloxane that has been diluted with a liquid dimethylvinylsiloxy terminated polydimethylsiloxane in an amount sufficient to achieve a platinum content of 0.7 weight percent. This mixture was then combined with 4.4 parts of

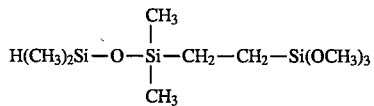

and the resultant mixture was heated at 130° C. for one hour, at which time 117.1 parts by weight of resin 2 was added and the resultant mixture was heated to a temperature of 130° C. 8.8 parts of 3-aminopropyltrimethoxysilane were then added to the molten material.

Curable composition 5 was prepared using the same ingredients and procedure as composition 4, with the exception that the 3-aminopropyltrimethoxysilane was replaced with 1 part of 2,5-di-isopropoxy-bis-ethylacetoacetate titanium.

Curable composition 6 was prepared using the same procedure described for example 4, with the following ingredients: 193.2 parts of resin 2, 75.96 parts of polyorganosiloxane E, 4.1 part of

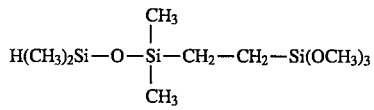

, 0.03 part of the platinum catalyst of composition 4, and 1 part of the titanium catalyst of composition 5.

Curable composition 7 was prepared by blending to homogeneity 177.1 parts of resin 2 with 180 part of a 50 weight percent solution in isopropanol of the product obtained by blending 39 parts of a liquid hydroxyl-terminated polydimethylsiloxane exhibiting a degree of polymerization of about 40 with 12 parts of 3-[N-(2-aminoethyl)amino]propyltrimethoxysilane. The resultant mixture was devolatilized under reduced pressure while heating sufficiently to maintain the composition as a melt. 0.5 part of 2, 5-di-isopropoxy-bis-ethylacetoacetate titanium was then added to the molten mixture.

Curable composition 8 was prepared using the same procedure described for composition 4 and the ingredients of composition 6, with the exception that the titanium catalyst was replaced with 3-aminopropyltrimethoxysilane.

Curable composition 9 was prepared by loading the following ingredients into a glass reactor: 58.3 parts of resin 1, 28.0 parts of polyorganosiloxane A, and 15.4 parts of polyorganosiloxane D. The contents of the reactor were then heated to 60° C., at which time 0.35 part of tetrabutyl titanate and 0.35 part of 2,5-di-isopropoxy-bis-ethylacetoacetate titanium were added.

The curable compositions were poured while molten from the reactor in which they were prepared into a cylindrical aluminum cartridge of the type used to dispense sealants. One end of the cylinder was closed with a surface containing a sealed opening through which material could be ejected from the cartridge. The other end of the cartridge was open, and was used to fill the cartridge with the molten curable compositions material, at which time a movable metal disk was inserted. Pressure was subsequently applied against the outer surface of the disk to force the contents of the cartridge through an opening made by puncturing the sealed opening in the other end of the cartridge. The opening was sealed during cooling of the compositions, all of which were non-flowable under ambient conditions.

When the composition solidified in the cartridge the seal in the cartridge was punctured and the cartridge placed in a commercially available hot melt spray gun equipped with an electrically operated heating element, a 1.2 mm-diameter spray nozzle, a compressed air inlet for pressurizing the interior compartment of the spray gun containing the cartridge of curable material. Compressed air was also supplied to eight gas jets in the form of channels on the circumference of a conical insert containing the nozzle of the spray gun. The channels measured 0.1 by 0.02 mm. The discharge orifices of the channels were located at equally spaced intervals at a distance of 1.2 mm from the nozzle.

When the spray gun was sealed and pressurized using from 20 to 75 psi of air pressure, the molten composition from the cartridge emerged from the spray nozzle as a continuous stream or droplets, depending upon the viscosity of the composition, and was deposited as a coating onto a substrate located about 12 cm. from the nozzle. The streams of compressed air emerging from the gas jets caused the stream of curable composition emerging from the nozzle to travel in a circular spiral toward the substrate. The air supplied to the jets contained about 0.1 weight percent of water vapor, equivalent to a relative humidity of 5 percent at 25° C., and the temperature of the air was 30° C.

The temperature within the cartridge container was gradually raised from 90° to 150° C. in ten degree increments during the application of compositions identified as 1, 2 and 3. At each 10 degree increment compressed air was admitted into the interior of the spray gun, forcing the curable composition to move from the cartridge through the nozzle and on to the surface of the substrate.

Compositions 4 to 9 were heated to a temperature of from 126° to 148° C. in the spray gun.

The substrate used for all of the compositions was a sheet of fiber glass filled epoxy resin available commercially as "FR-4 board".

All of the coatings solidified within one minute after being applied and cured within 24 hours.

That which is claimed is:

1. A method for coating a substrate with a molten moisture curable organosiloxane composition exhibiting a melting point of at least 30 degrees C., said method comprising the steps of 1) maintaining a supply of said composition in a reservoir at a temperature above the melting point of said composition, wherein said reservoir communicates with at least one nozzle;

2) extruding said composition through said nozzle, thereby producing a stream of said composition directed toward said substrate;

3) supplying a current of gas directed against said stream to control the direction and configuration of said stream, wherein the temperature of said gas current is maintained substantially constant and above 25° C., the relative humidity within said gas current is maintained substantially constant and within the range of from 5 to 95 percent, measured at 25° C., and said gas current creates an environment in the area between said nozzle and said substrate wherein at least the surface layer of said composition cures at a reproducible rate irrespective of the indigenous temperature and humidity in the area adjacent to said environment.

2. A method according to claim 1 wherein the temperature of said gas current is from 30° to 150° C.; the relative humidity within said gas current is from 40 to 95 percent, measured at 25° C.; said gas is selected from the group consisting of air, oxygen, nitrogen, and mixtures of air and steam.

3. A method according to claim 1 wherein said curable composition comprises a moisture curable polyorganosiloxane that is a liquid at 25° C. and comprises repeating siloxane units, and an organosiloxane copolymer comprising units of the formulae $R^1_3SiO_{1/2}$ and $SiO_{4/2}$, wherein $R^1$ represents a substituted or unsubstituted monovalent hydrocarbon radical wherein any substituents do not react with other ingredients of said composition, said copolymer is a solid at 25° C. and exhibits a flow temperature of from 40° to 200° C., and said polyorganosiloxane contains a concentration of silicone-bonded hydrolyzable groups sufficient to cure said composition.

4. A method according to claim 3 wherein at least 50 percent of the siloxane units of said polyorganosiloxane are difunctional units of the formula $R^2R^3SiO$, up to about 20 percent are trifunctional units of the formula $R^4SiO_{3/2}$, and the terminal units exhibit the formula $R^5_aY_{3-a}SiG-$, wherein $R^2$ is selected from the group consisting of $R^1$ and alkoxy groups, $R^3$ and $R^4$ are individually selected from the same group of hydrocarbon radicals as $R^1$, $R^5$ is selected from the group consisting of aminoalkyl radicals and $R^1$, G is selected from the group consisting of siloxane, siloxyalkylene and oxygen, Y is a hydrolyzable group, a is 0 or 1, the viscosity of said polyorganosiloxane is from 20 to 100 Pa.s at 25° C., and said copolymer constitutes from 40 to 80 percent of the combined weight of said moisture curable polyorganosiloxane and said copolymer, and said gas stream contains a curing catalyst for said composition.

5. A method according to claim 3 wherein $R^1$ is selected from the group consisting of methyl, phenyl and 3,3,3-trifluoropropyl, and said composition contains as a curing agent a silane of the formula $R^6_nSiZ_{(4-n)}$, where $R^6$ represents an alkyl or a phenyl radical and Z is a hydrolyzable group that reacts under ambient conditions with the hydrolyzable groups represented by Y on said curable polyorganosiloxane.

6. A method according to claim 5 wherein said gas is air, $R^1$ is methyl, $R^2$ is methyl, $R^3$ is methyl or phenyl, and Y is alkoxy, aminoalkoxy or ketoximo.

* * * * *